United States Patent
Xu et al.

(10) Patent No.: US 12,423,177 B2
(45) Date of Patent: *Sep. 23, 2025

(54) SYSTEM AND METHODS FOR MANAGING THE DATA INTEGRITY OF READ AND WRITE OPERATIONS

(71) Applicant: Lemon Inc., Grand Cayman (KY)

(72) Inventors: Peng Xu, Los Angeles, CA (US); Fei Liu, Los Angeles, CA (US); Kyoungryun Bae, Los Angeles, CA (US); Jinhyuk Kim, Los Angeles, CA (US); Prathamesh Amritkar, Los Angeles, CA (US); Dengcheng Zhu, Los Angeles, CA (US); Wei Tang, Los Angeles, CA (US); Sheng Qiu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,490

(22) Filed: Feb. 20, 2024

(65) Prior Publication Data

US 2024/0248793 A1 Jul. 25, 2024

(51) Int. Cl.
*G06F 11/00* (2006.01)
*G06F 11/10* (2006.01)

(52) U.S. Cl.
CPC ...... *G06F 11/1004* (2013.01); *G06F 11/1016* (2013.01); *G06F 11/1068* (2013.01)

(58) Field of Classification Search
CPC ............. G06F 11/1004; G06F 11/1016; G06F 11/1076; G06F 11/1064; G06F 11/1068; G06F 11/1629; G06F 11/28
See application file for complete search history.

(56) References Cited

U.S. PATENT DOCUMENTS

| | | | |
|---|---|---|---|
| 9,823,960 B2* | 11/2017 | Wang | H03M 13/09 |
| 10,389,481 B2* | 8/2019 | Ren | H04L 1/08 |
| 10,922,167 B2* | 2/2021 | Her | G06F 9/30101 |
| 11,018,693 B2* | 5/2021 | Meier | G06F 21/64 |

(Continued)

OTHER PUBLICATIONS

European Patent Office, Extended European Search Report Issued in Application No. 24221028.4, mailed Jun. 2, 2025, Germany, 6 pages.

*Primary Examiner* — Esaw T Abraham
(74) *Attorney, Agent, or Firm* — Alleman Hall & Tuttle LLP

(57) ABSTRACT

A computing system for verifying data integrity is provided, including a host device comprising a memory controller, and a storage device. The memory controller receives original data blocks, each having an associated initial CRC value. The memory controller then segments and recombines the data blocks into logic blocks. The storage device is configured to write the logic blocks to its non-volatile memory of the storage device in the write operation, calculate a new logic block (LB) CRC value for each logic block, and calculate a combined LB CRC value. After the write operation, the memory controller combines duplicated copies of a given CRC value for each of the original data blocks, then combines them together to calculate a combined segments CRC value, and compares the combined segments CRC value to the combined LB CRC value. When the combined CRC values match, a verification response is generated verifying data integrity.

20 Claims, 7 Drawing Sheets

(56) References Cited

U.S. PATENT DOCUMENTS

| | | | |
|---|---|---|---|
| 11,295,036 B2* | 4/2022 | Young | H04L 63/12 |
| 11,309,994 B2* | 4/2022 | Jain | H04L 1/0061 |
| 2007/0260623 A1 | 11/2007 | Jaquette et al. | |
| 2017/0322878 A1* | 11/2017 | Wang | G06F 11/1076 |

* cited by examiner

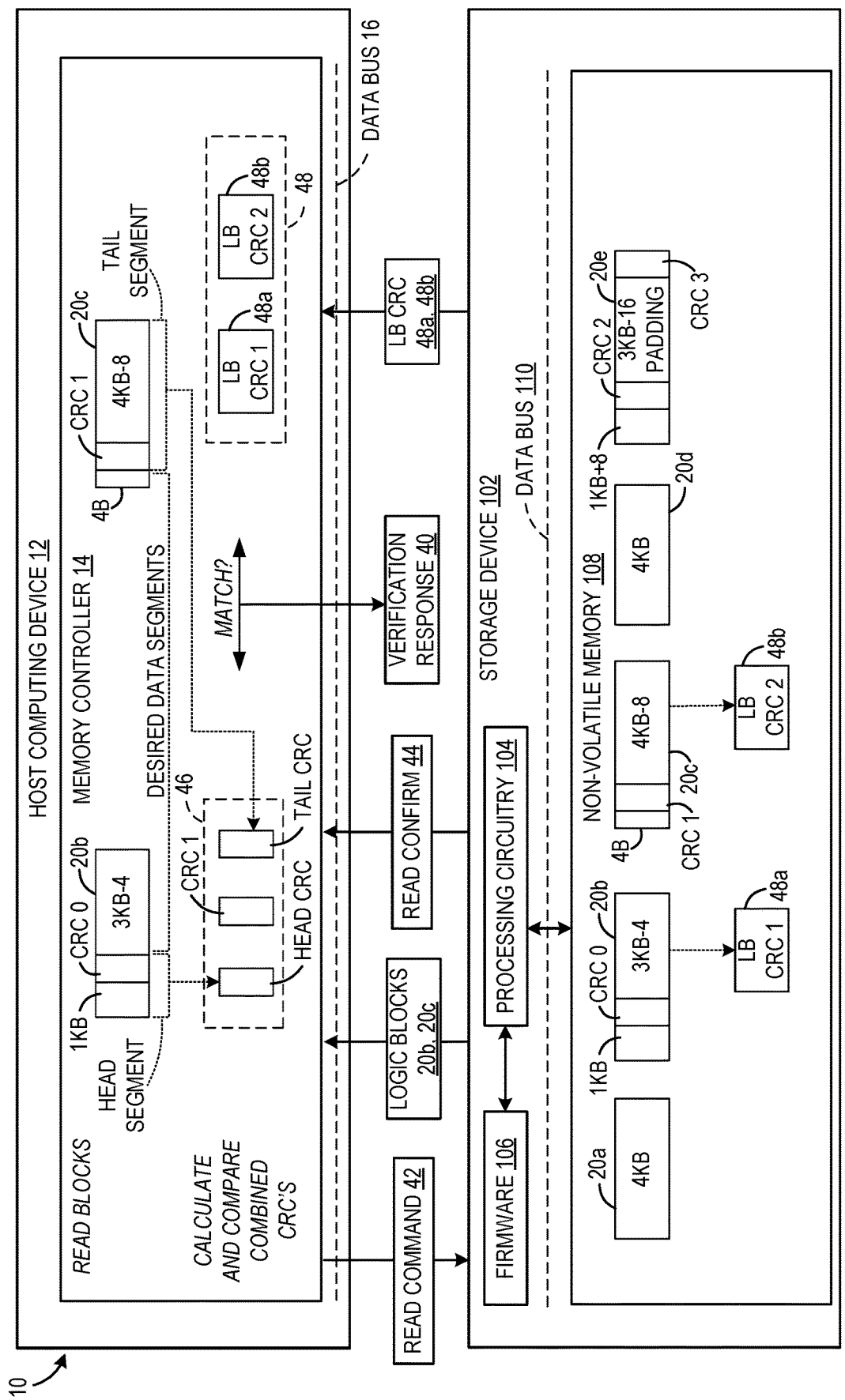

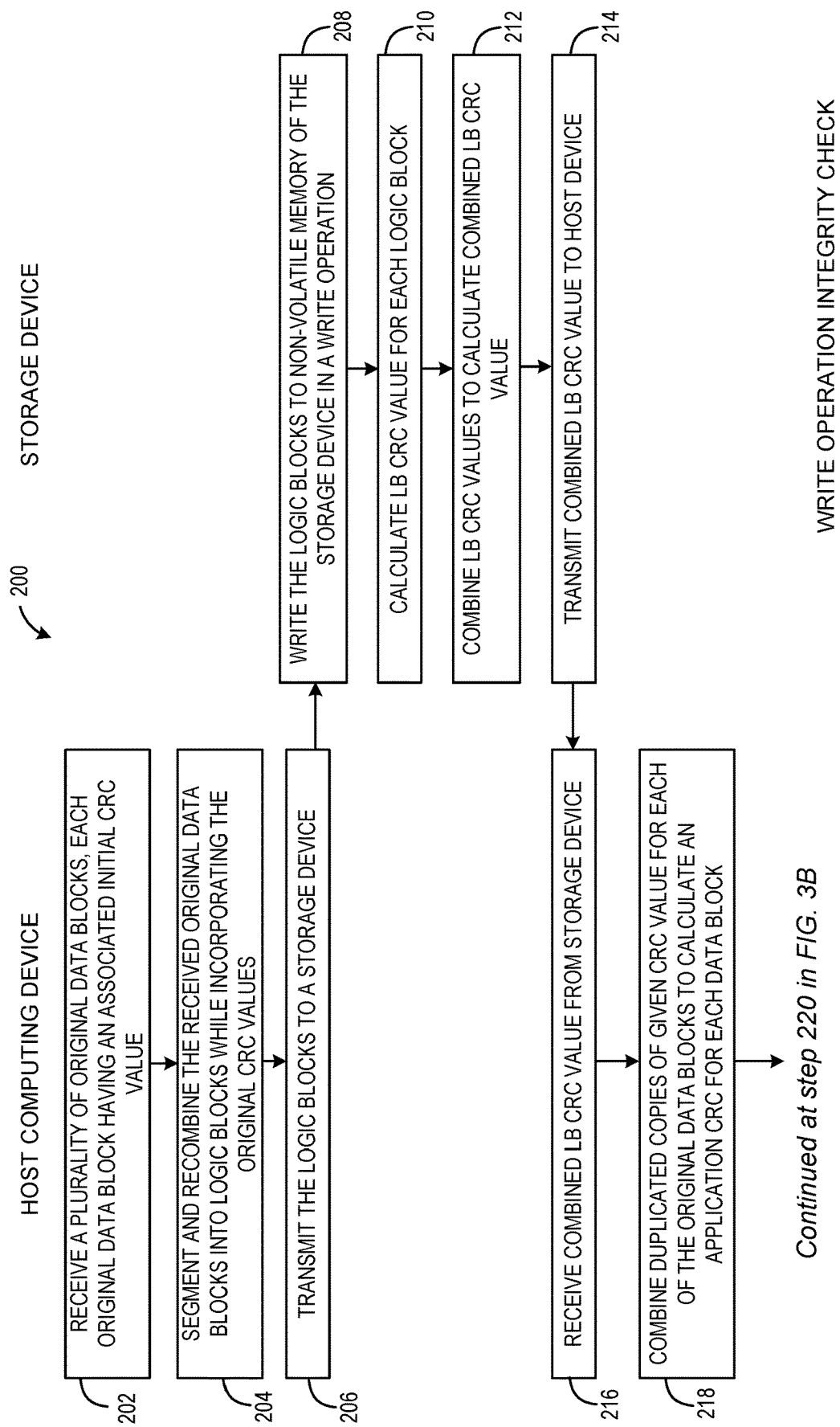

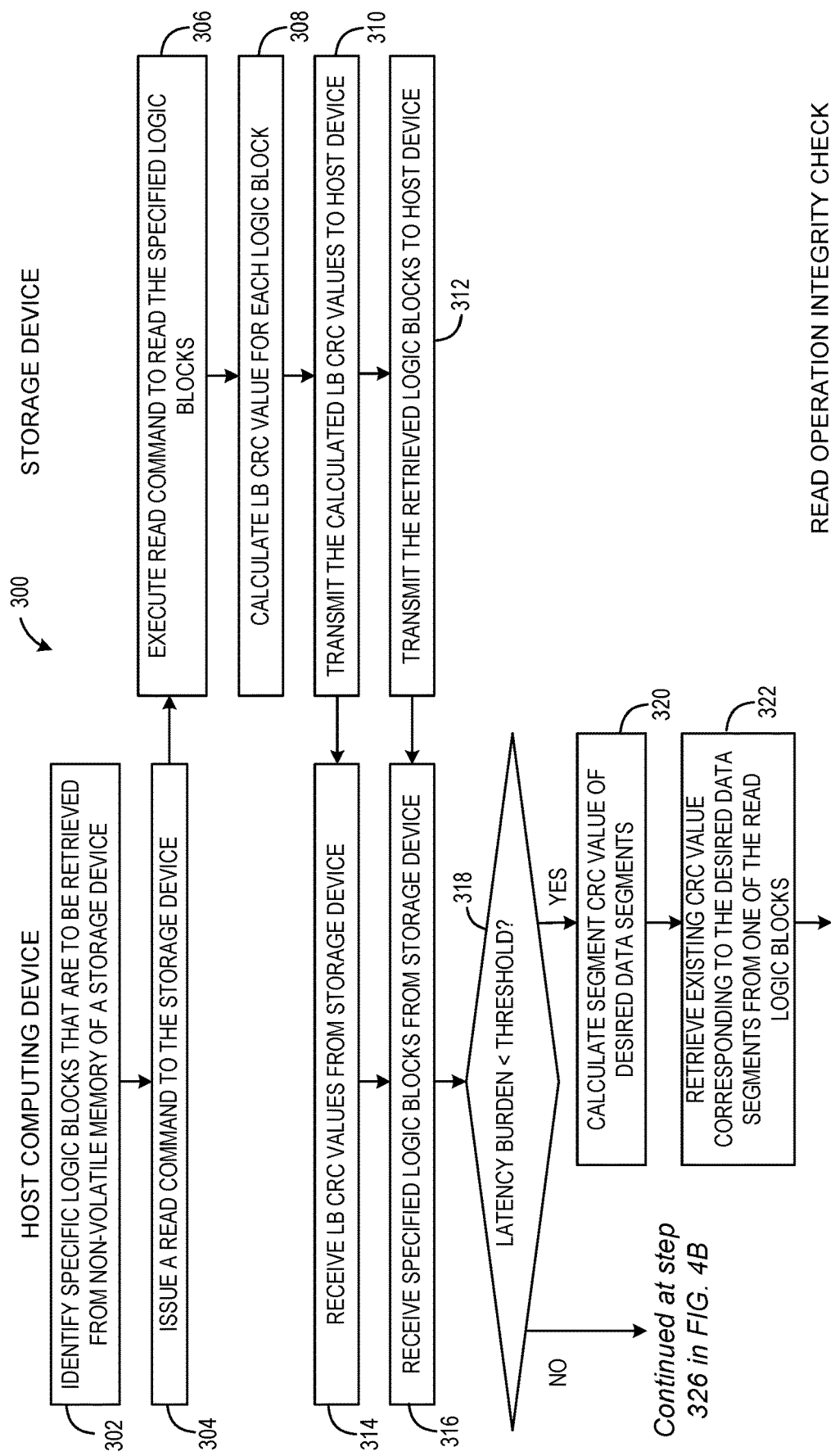

(12) United States Patent

SYSTEM AND METHODS FOR MANAGING THE DATA INTEGRITY OF READ AND WRITE OPERATIONS

BACKGROUND

In the field of computing, the integrity of data during read and write operations to storage devices is critical in the design of storage systems. The preservation of data without corruption or alteration is paramount, as any instance of data corruption can lead to significant operational and financial consequences. Despite the importance of data integrity, achieving absolute prevention of data corruption is extremely challenging, primarily due to software and hardware issues.

Software components, ranging from applications and drivers to operating systems, can inadvertently cause memory corruption. In Direct Memory Access (DMA) technology, which is extensively utilized in contemporary storage systems, the transfer of data through a DMA engine, which is a hardware module, bypasses traditional processor operations. Consequently, several software-based methods for memory address space protection become ineffective. A malfunction in software or hardware leading to an incorrect address can result in data being transferred to an unanticipated location, making the debugging process particularly challenging as the processor does not execute these transfers. Furthermore, Dynamic Random-Access Memory (DRAM) is prone to a low probability of unintended bit flips, which can lead to data corruption.

In the storage industry, a technique known as Cyclic Redundancy Check (CRC) is the predominant method for checking data integrity. This technique allows an application to verify the data payload and its corresponding CRC at any given time to ensure consistency. Data corruption is identified when a CRC mismatch occurs.

However, the implementation of CRC protection faces several challenges. There may exist gaps in the data path during data transfer or storage, creating a window of vulnerability where data corruption can occur. Moreover, employing the processing hardware to calculate CRC values consumes significant processing resources.

SUMMARY

In view of the above, a computing device for managing data integrity is provided, including a host device comprising a memory controller, and a storage device. The memory controller is configured to receive a plurality of original data blocks. Each original data block has an associated initial CRC value. The memory controller then segments and recombines the received original data blocks into logic blocks. The storage device is configured to write the logic blocks to non-volatile memory of the storage device in the write operation, calculate a new logic block (LB) CRC value for each logic block, and calculate a combined LB CRC value for the logic blocks by combining the LB CRC values.

After the write operation, the memory controller combines duplicated copies of a given CRC value for each of the original data blocks to calculate an application CRC value for each original data block, combines the application CRC values together to calculate a final combined segments CRC value, and compares the final combined segments CRC value to the combined LB CRC value. The memory controller determines whether the final combined segments CRC value matches the combined LB CRC value. Responsive to determining that the final combined segments CRC value matches the combined LB CRC value, the memory controller generates a verification response verifying the integrity of the write operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 illustrates a schematic view of the computing system of FIG. 1, managing the data integrity of a read operation, according to an example of the present disclosure.

FIGS. 3A and 3B are a flowchart of a first method for managing the data integrity of a write operation according to an example embodiment of the present disclosure.

FIGS. 4A and 4B are a flowchart of a second method for managing the data integrity of a read operation according to an example embodiment of the present disclosure.

DETAILED DESCRIPTION

In view of the above issues, the present disclosure describes a device and method for managing the data integrity of data blocks that are written to non-volatile memory of a storage device.

Figure 1:
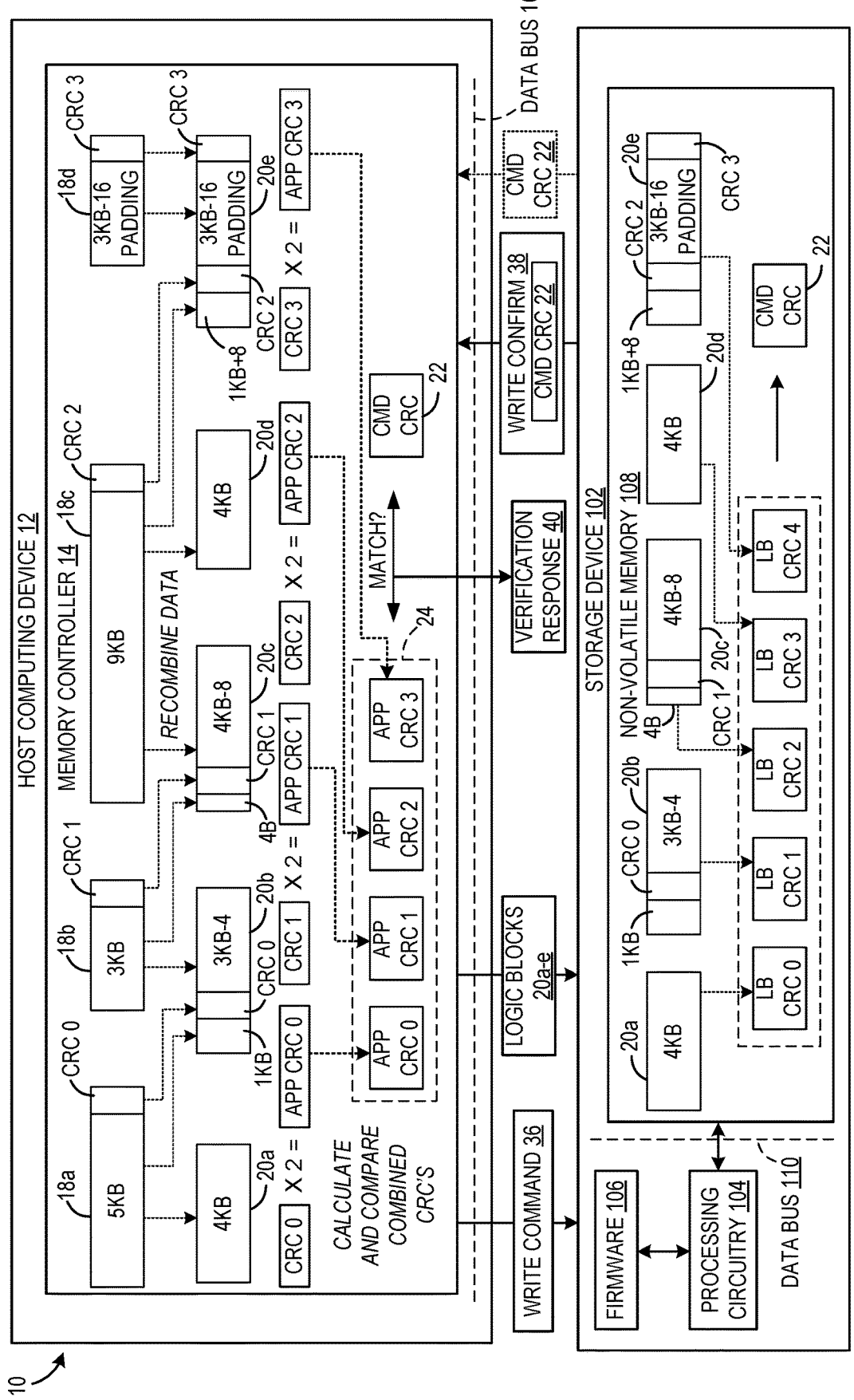
FIG. 1 illustrates a schematic view of a computing system for managing the data integrity of a write operation, according to an example of the present disclosure.

Referring to FIG. 1, a computing system 10 comprises a host computing device 12 including a memory controller 14 configured to receive a plurality of original data blocks 18a-d for writing to a storage device 102. In this example, four original data blocks 18a-d are initially received. Each original data block has an associated initial CRC value. The first block 18a is 5 KB in size and includes an associated CRC value, CRC 0. The second block 18b is 3 KB in size and includes an associated CRC 1. The third block 18c is 9 KB in size and includes an associated CRC 2. The fourth block 18d is a 3 KB padding and includes an associated CRC 3.

CRC values are calculated using CRC algorithms which function by treating the packet of data to be transmitted or stored as a large polynomial, represented by a binary number. The data is divided by a predetermined, fixed binary divisor, known as the generator polynomial. The remainder of this division, which is the CRC value, is then appended to the data.

To perform read and write operations, the memory controller 14 may implement the Non-Volatile Memory Express (NVMe) protocol, which is used in the operation of solid-state drives (SSDs) utilizing PCIe interfaces. Alternatively, the memory controller 14 may implement other interfaces including SATA (serial ATA) or SAS (serial Attached SCSI). The memory controller 14 may also be implemented in enterprise storage solutions, including RAID (Redundant Array of Independent Disks) systems and network-attached storage (NAS) units.

Following receipt of the original data blocks 18a-d, the memory controller 14 segments and/or recombines the data blocks 18a-d into logic blocks 20a-e suitable for writing to the storage device 102. The memory controller 14 may segment the data blocks 18a-d into different sizes before recombining them into the logic blocks 20a-e. During the segmentation process, the original CRC values included in the original data blocks 18a-d are not removed. Instead, the original CRC values from the data blocks 18a-d are incorporated into the logic blocks 20a-e. In this example, the first block 18a of 5 KB is split into a first segment of 4 KB which is incorporated into the first logic block 20a, a 1 KB second segment which is incorporated into the second logic block 20b, and the initial CRC 0 which is also incorporated into the second logic block 20b. The second data block 18b of 3 KB is split into a third segment of 3 KB which is incorporated into the second logic block 20b, a fourth segment of 4B which is incorporated into the third logic block 20c, and the initial CRC 1 which is also incorporated into the third logic block 20c. The third data block 18c of 9 KB is split into a fifth segment of 4 KB which is incorporated into the third logic block 20c, a sixth segment of 4 KB which is incorporated into the fourth logic block 20d, a seventh segment of 1 KB which is incorporated into the fifth logic block 20e, and the initial CRC 2 which is also incorporated into the fifth logic block 20e. The eighth segment of 3 KB-16 padding and the initial CRC 3 from the fourth data block 18d are incorporated into the fifth logic block 20e.

It will be appreciated that no CRC check is performed prior to segmentation. In other words, before the logic blocks 20a-e are generated, the CRC values for each data block 18a-d is not calculated to verify data integrity. Thus, the memory controller 14 omits a CRC check that is conventionally performed prior to segmentation.

The memory controller 14 transmits the generated logic blocks 20a-e to the storage device 102 in a write command 36 via a data bus 16. In accordance with the write command 36, the memory controller 14 writes the logic blocks 20a-e to the non-volatile memory 108 of the storage device 102 in a write operation. It will be noted that no associated CRC values are calculated and attached to each logic block 20a-e before the logic blocks 20a-e are written to the non-volatile memory 108 of the storage device 102.

The storage device 102 comprises processing circuitry 104, firmware 106, and a data bus 110 coupled to the processing circuitry 104 and the non-volatile memory 108. The processing circuitry 104 may be configured to execute a writing program to receive the write command 36, and execute the write command 36 on one or more given zones of the non-volatile memory 108. The processing circuitry 104 is a microprocessor, which can include an application specific integrated circuit (ASIC). The firmware 106 may be configured as permanent software programmed into a read-only memory of the storage device 102. In one particular example, the storage device 102 may be a rack mounted storage platform containing individual solid state drives.

Upon successful completion of the write operation, the storage device 102 calculates a LB CRC for each logic block 20a-e which was written to the non-volatile memory 108 of the storage device 102, performing single block CRC calculations for each logic block 20a-e. In this example, the storage device 102 calculates a first LB CRC 0 for the first logic block 20a, a second LB CRC 1 for the second logic block 20b, a third LB CRC 2 for the third logic block 20c, a fourth LB CRC 3 for the fourth logic block 20d, and a fifth LB CRC 4 for the fifth logic block 20e. It will be appreciated that this is the only step for which the computing system 10 performs single block CRC calculations during the write operation.

The storage device 102 then combines the CRC values of each of the logic blocks 20a-e together to calculate a combined LB CRC value 22. The combination of the CRC values may be performed by initially concatenating the data blocks virtually, respecting their order. The CRC of this concatenated virtual data block is calculated using the same CRC algorithm and polynomial that were used to generate the CRC values for the original data blocks 18a-d and the logic blocks 20a-e.

The storage device 102 sends a write confirmation 38, which may be a completion queue entry including details about the completed operation, such as a success status and any relevant identifiers. In NVMe and other high-performance storage interfaces, the completion queue entry consists of several Dwords, one or more of which may contain the write confirmation 38 including information regarding the status and result of the executed write command 36. For example, the write confirmation 38 may take the form of a specific set of bits within the first Dword (Dword 0) or the fourth Dword (Dword 3) indicating a command specific status, including a completion status and a phase bit to indicate whether the entry is new. The completion status may indicate the success of the write operation, types of errors encountered or other pieces of information about the completion of the write operation.

The combined LB CRC value 22 calculated by the storage device 102 may be transmitted to the memory controller 14 incorporated in the write confirmation 38, or alternatively sent to the memory controller 14 separately from the write confirmation 38. For example, the combined LB CRC value 22 may be incorporated as a Dword in a field in the write confirmation 38 which is structured as a completion queue entry. The memory controller 14 subsequently receives the write confirmation 38 from the storage device 102 after writing the logic blocks 20a-e to the non-volatile memory 108 of the storage device 102.

The memory controller 14 then combines the duplicated copies of a given CRC value of each of the original data blocks 18a-d together to calculate an application CRC for each data block 18a-d. In this example, the initial CRC 0 of the first data block 18a is duplicated, and the duplicates of the initial CRC 0 are combined together to calculate a first application CRC 0. The initial CRC 1 of the second data block 18b is duplicated, and the duplicates of the initial CRC 1 are combined together to calculate a second application CRC 1. The initial CRC 2 of the third data block 18c is duplicated, and the duplicates of the initial CRC 2 are combined together to calculate a third application CRC 2. The initial CRC 3 of the fourth data block 18d is duplicated, and the duplicates of the initial CRC 3 are combined together to calculate a fourth application CRC 3.

The first application CRC 0, the second application CRC 1, the third application CRC 2, and the fourth application CRC 3 are combined together to calculate a combined data CRC value 24. The combination of the CRC values may be performed using the same CRC algorithm and polynomial that were used to generate the CRC values for the original data blocks 18a-d, the logic blocks 20a-e, and the combined LB CRC value 22.

The memory controller 14 then compares the combined LB CRC value 22 to the combined data CRC value 24 and determines whether the two CRC values match. Responsive to determining that the two CRC values match, the memory controller 14 generates and outputs a verification response 40 indicating that the integrity of the write operation is verified. Responsive to determining that the two CRC values 22, 24 do not match, the memory controller 14 generates and outputs a verification response 40 warning that a loss of integrity of the write operation is suspected.

Referring to FIG. 2, the read operation of the computing device 12 in reading logic blocks 20*b*, 20*c* from the non-volatile memory 108 of the storage device 102 is described in detail. The memory controller 14 initiates the read process by identifying the specific logic blocks 20*b*, 20*c* that are to be retrieved from the non-volatile memory 108 of the storage device 102. The memory controller 14 identifies specific target logic blocks of the logic blocks 20*a-e* that contain the desired data segments to be read, such that the identified logic blocks contain both the desired data segments and the CRC value associated with the desired data segments. In this example, the specific logic blocks 20*b*, 20*c* are identified to be retrieved to read the 3 KB segment in the second logic block 20*b* and the 4B segment in the third logic block 20*c*. In the third logic block 20*c*, CRC 1 is the CRC value that was calculated for segments 3 KB-4 and 4B before they were split apart into two data blocks 20*b*, 20*c*, when segments 3 KB-4 and 4B were still joined together. Therefore, CRC 1 is the CRC value that corresponds to the desired data segments to be read.

Once the target logic blocks 20*b*, 20*c* are identified, the memory controller 14 issues a read command 42 to the storage device 102. This command includes the addresses or identifiers of the logic blocks 20*b*, 20*c* to be read. The read command 42 is transmitted via a data bus 16, which connects the memory controller 14 to the storage device 102. In NVMe devices, for example, the data bus 16 may be a PCIe bus.

Upon receiving the read command 42, the storage device 102 locates the specified logic blocks 20*b*, 20*c* within its non-volatile memory 108. The processing circuitry 104 may be configured to execute a read program to receive the read command 42, and execute the read command 42 on one or a plurality of given zones of the non-volatile memory 108. The storage device 102 then reads these specified logic blocks 20*b*, 20*c*, preparing them for transmission back to the memory controller 14.

The logic block CRC values 48*a*, 48*b* for each of the read logic blocks 20*b*, 20*c* are calculated by the processing circuitry 104 of the storage device 102. In this example, LB CRC 1 is calculated for the first read logic block 20*b*, and LB CRC 2 is calculated for the second read logic block 20*c*. The storage device 102 transmits the read logic blocks 20*b*, 20*c* and the LB CRC values 48*a*, 48*b* back to the memory controller 14 over the data bus 110.

Along with the logic blocks 20*b*, 20*c* and the calculated LB CRC values 48*a*, 48*b*, the storage device 102 sends a read confirmation 44 to the memory controller 14. This read confirmation 44 may include details about the success of the read operation, such as the status of the operation and any errors encountered. The read confirmation 44 ensures that the specific logic blocks 20*b*, 20*c* have been correctly and completely retrieved from the non-volatile memory.

Responsive to receiving the logic blocks 20*b*, 20*c* and the read confirmation 44, the memory controller 14 performs a data integrity check. The memory controller 14 determines a head segment, or a segment of data which immediately precedes the desired data segments which were read. In this example, the head segment is determined to be the 1 KB segment and the CRC 0 value which immediately precedes the desired data segments. In this example, the desired data segments are the combination of the 3 KB-4 segment and the 4B segment. The memory controller 14 then calculates a head CRC value for the head segment.

The memory controller 14 then determines a tail segment, or a segment of data which immediately follows the desired data segments which were read. In this example, the tail segment is determined to be the CRC 1 value and the 4 KB-8 segment which immediately follow the desired data segment. The memory controller 14 then calculates a tail CRC value for the tail segment.

Further, the memory controller 14 retrieves a CRC value for the desired data segments from one of the read logic blocks 20*b*, 20*c*. In this example, instead of recalculating the CRC value for the combination of the 3 KB-4 segment and the 4B segment, the memory controller 14 retrieves the existing CRC 1 value from the second read logic block 20*c*. This existing CRC 1 value corresponds to the combined 3 KB-4 segment and 4B segment.

The memory controller 14 combines the three CRC values (head CRC value, tail CRC value, and the retrieved existing CRC 1 value) to calculate a final combined segments CRC value 46, which is representative of the overall data integrity across all segments of the read logic blocks 20*b*, 20*c*.

Concurrently, the memory controller 14 also combines the LB CRC values 48*a*, 48*b* received from the storage device 102 to generate a combined LB CRC value 48. In other embodiments, the processing circuitry 104 of the storage device 102 may be configured to generate the combined LB CRC value 48 and transmit the combined LB CRC value 48 to the memory controller 14.

The memory controller 14 then compares the final combined segments CRC value 46 to the combined LB CRC value 48 and determines whether the two CRC values match. Responsive to determining that the two CRC values match, the memory controller 14 generates and outputs a verification response 40 indicating that the integrity of the read operation is verified. This response 40 indicates that the data integrity of the read logic blocks 20*b*, 20*c* has been successfully verified, confirming that the data retrieved is accurate and unaltered. Responsive to determining that the two CRC values 46, 48 do not match, the memory controller 14 generates and outputs a verification response 40 warning that a loss of integrity of the read operation is suspected.

Accordingly, by meticulously calculating and comparing CRC values at different stages of the data reading process, the memory controller 14 may accurately confirm the reliability and accuracy of the data 20*b*, 20*c* retrieved from the storage device 102. Further, by relying on the processing power of the storage device 102 to perform calculations of the logic block CRC values of each read logic block 20*b*, 20*c*, some of the processing burden of the data integrity checks can be redistributed away from the memory controller 14.

After confirming the integrity of the read logic blocks 20*b*, 20*c*, the memory controller 14 makes the retrieved logic blocks 20*b*, 20*c* available to the computing device 12. This may involve placing the data into system memory or passing it directly to the requesting application or process.

It will be appreciated that, in the read process, the memory controller 14 does not recalculate the attached CRC value for each read logic block 20*b*, 20*c*. For example, the memory controller 14 does not recalculate the CRC value for the combination of the 3 KB-4 segment and the 4B segment.

However, the memory controller 14 may additionally be configured, so that the CRC value of the desired data segments is calculated if a latency burden for calculating the CRC value of the desired data segment is less than a predetermined threshold. This latency burden may be determined by the size of the desired data segments. For example, the memory controller 14 may be configured to estimate a time required for CRC calculation based on a segment size of the desired data segments, and proceed only if this estimated time is below a predetermined time threshold. The memory controller 14 may also take into account other considerations for estimating the time required for CRC calculation, taking into account a data complexity of the desired data segments, a current workload on the storage device 102, and inherent read speeds of the storage device 102, for example.

When the memory controller 14 determines that the latency burden is less than the predetermined threshold, the memory controller 14 calculates the segment CRC value of the desired data segments. Then the memory controller 14 may check data integrity by retrieving the existing CRC value corresponding to the desired data segments from one of the read logic blocks 20*b*, 20*c*, and comparing the segment CRC value to the existing CRC value corresponding to the desired data segments. In this example, the data integrity check may be performed by calculating the segment CRC value of the combined data segments of 3 KB-4 and 4B, and comparing the calculated segment CRC value to the corresponding attached CRC 1 value in the second read logic block 20*c*. Responsive to determining that the two CRC values match, the memory controller 14 generates and outputs a verification response 40 indicating that the integrity of the read operation is verified. This response 40 indicates that the data integrity of the read logic blocks 20*b*, 20*c* has been successfully verified, confirming that the data retrieved is accurate and unaltered. Responsive to determining that the two CRC values do not match, the memory controller 14 generates and outputs a verification response 40 warning that a loss of integrity of the read operation is suspected.

Figure 3B:
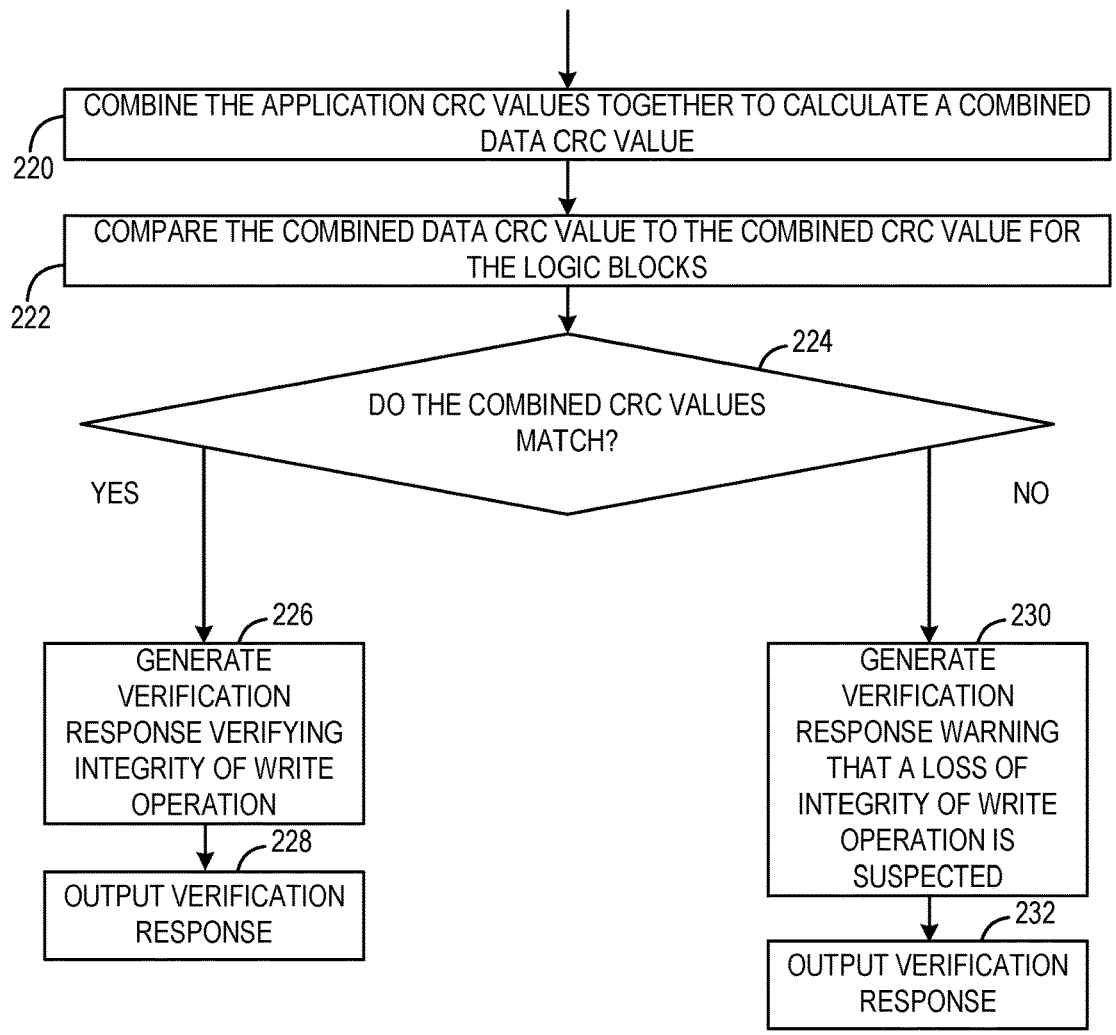

FIGS. 3A and 3B illustrate a flowchart of a computerized first method 200 for managing data integrity of a write operation writing data to the non-volatile memory of a storage device. The first method 200 may be implemented on the computing system 10 illustrated in FIG. 1 above, which include the host computing device 12 and the storage device 102. Alternatively, other suitable computing hardware and software may be utilized.

At 202, the method includes, at the host device, receiving a plurality of original data blocks, each original data block having an associated initial CRC value. At 204, the method includes, at the host device, segmenting and recombining the received original data blocks into logic blocks while incorporating the original CRC values from the original data blocks. At 206, the method includes, at the host device, transmitting the logic blocks to the storage device.

At 208, the method includes, at the storage device, writing the logic blocks to a non-volatile memory of the storage device in a write operation. At 210, the method includes, at the storage device, calculating a LB CRC value for each logic block which was written to the non-volatile memory of the storage device. At 212, the method includes combining the LB CRC values to calculate a combined LB CRC value. At 214 the method includes, at the storage device, transmitting the combined LB CRC value to the host device.

At 216, the method includes, at the host device, receiving the combined LB CRC value from the storage device. At step 218, the method includes, at the host device, combining duplicated copies of a given CRC value for each of the original data blocks to calculate an application CRC value for each original data block. At step 220, the method includes, at the host device, combining the application CRC values together to calculate a combined data CRC value.

At 222, the method includes, at the host device, comparing the combined CRC values. At 224, the method includes, at the host device, determining whether the combined CRC values match. At 226, the method includes, at the host device, responsive to determining that the combined CRC values match, generating a verification response verifying the integrity of the write operation. At 228, the method includes, at the host device, outputting the verification response.

At 230, the method includes, at the host device, responsive to determining that the combined CRC values do not match, generating a verification response warning that a loss of integrity of the write operation is suspected. At 232, the method includes, at the host device, outputting the generated verification response.

Figure 4B:
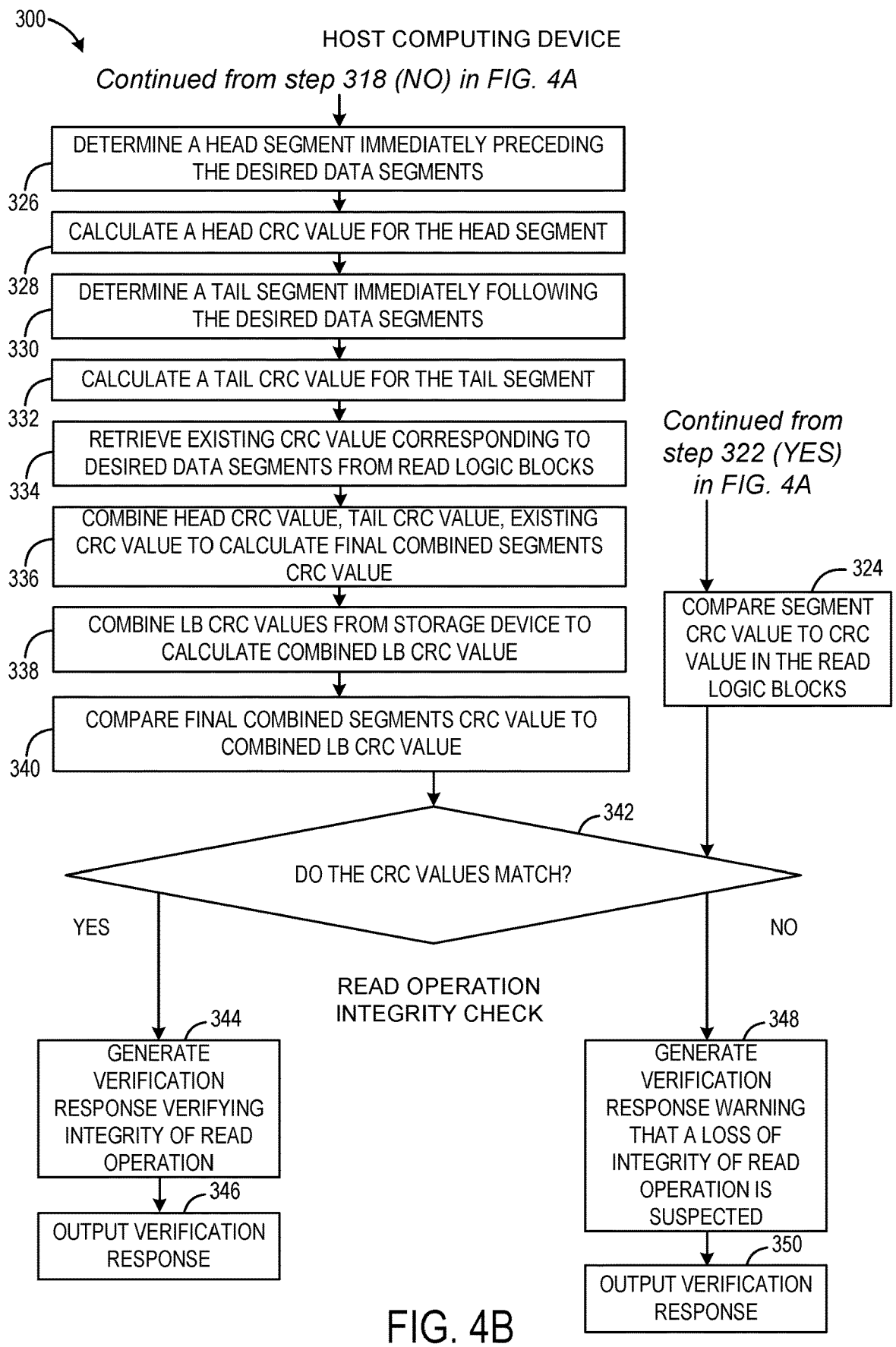

FIGS. 4A and 4B illustrate a flowchart of a computerized second method 300 for managing data integrity of a read operation reading data from the non-volatile memory of a storage device. The second method 300 may be implemented on the computing system 10 illustrated in FIG. 2 above, which include the host computing device 12 and the storage device 102. Alternatively, other suitable computing hardware and software may be utilized.

At 302, the method includes, at the host device, identifying specific target logic blocks that are to be retrieved from non-volatile memory of a storage device. These target logic blocks contain the desired data segments to be read. At 304, the method includes, at the host device, issuing a read command to the storage device.

At 306, the method includes, at the storage device, executing the read command to read the specified logic blocks. At 308, the method includes, at the storage device, calculating a logic block CRC value for each specified logic block. At 310, the method includes, at the storage device, transmitting the calculated LB CRC values to the host device. At 312, the method includes, at the storage device, transmitting the retrieved logic blocks to the host device.

At 314, the method includes, at the host device, receiving the LB CRC values from the storage device. At 316, the method includes, at the host device, receiving the specified logic blocks from the storage device. At 318, the method includes, at the host device, estimating a latency burden of calculating the segment CRC value of the desired data segments, and determining whether the estimated latency burden is below a predetermined threshold.

At 320, the method includes, at the host device, responsive to determining that the estimated latency burden is below the predetermined threshold, calculating the segment CRC value of the desired data segments. At 322, the method includes, at the host device, retrieving the existing CRC value corresponding to the desired data segments from one of the read logic blocks. At 324, the method includes, at the host device, comparing the segment CRC value to the CRC value retrieved from one of the logic blocks. The method then proceeds to 342 to compare the segment CRC value to the CRC value retrieved from one of the logic blocks.

At 326, the method includes, at the host device, responsive to determining that the estimated latency burden is not below the predetermined threshold, determining a head segment immediately preceding the desired data segments. At 328, the method includes, at the host device, calculating a head CRC value for the head segment.

At 330, the method includes, at the host device, determining a tail segment immediately following the desired data segments. At 332, the method includes, at the host device, calculating a tail CRC value for the tail segment.

At 334, the method includes, at the host device, retrieving the existing CRC value corresponding to the desired data segments from one of the read logic blocks. At 336, the method includes, at the host device, combining the calculated head CRC value, tail CRC value, and the retrieved existing CRC value corresponding to the desired data segments to calculate a final combined segments CRC value. At 338, the method includes, at the host device, combining the LB CRC values received from the storage device to calculate the combined LB CRC value. At 340, the method includes, at the host device, comparing the final combined segments CRC value to the combined LB CRC value.

At 342, the method includes, at the host device, determining whether the CRC values match. When 342 continues from 340, the method determines whether the combined LB CRC value matches the final combined segments CRC value. When 342 continues from 324, the method determines whether the retrieved existing CRC value matches the calculated segment CRC value of the desired data segments.

At 344, the method includes, at the host device, responsive to determining that the CRC values match, generating a verification response verifying the integrity of the read operation. At 346, the method includes, at the host device, outputting the verification response. At 348, the method includes, at the host device, responsive to determining that the combined CRC values do not match, generating a verification response warning that a loss of integrity of the read operation is suspected. At 350, the method includes, at the host device, outputting the generated verification response.

The above-described system, devices, and methods enhance data integrity in storage systems by providing a robust mechanism for verifying the integrity of data during read and write operations to storage devices. Redundant CRC calculations are minimized, and end-to-end data protection is ensured after the segmentation of original data blocks into logic blocks for writing operations. The minimization of redundant CRC calculations also streamlines read operations which retrieve logic blocks from storage devices, while maintaining high reliability and accuracy in data transfer and storage processes.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
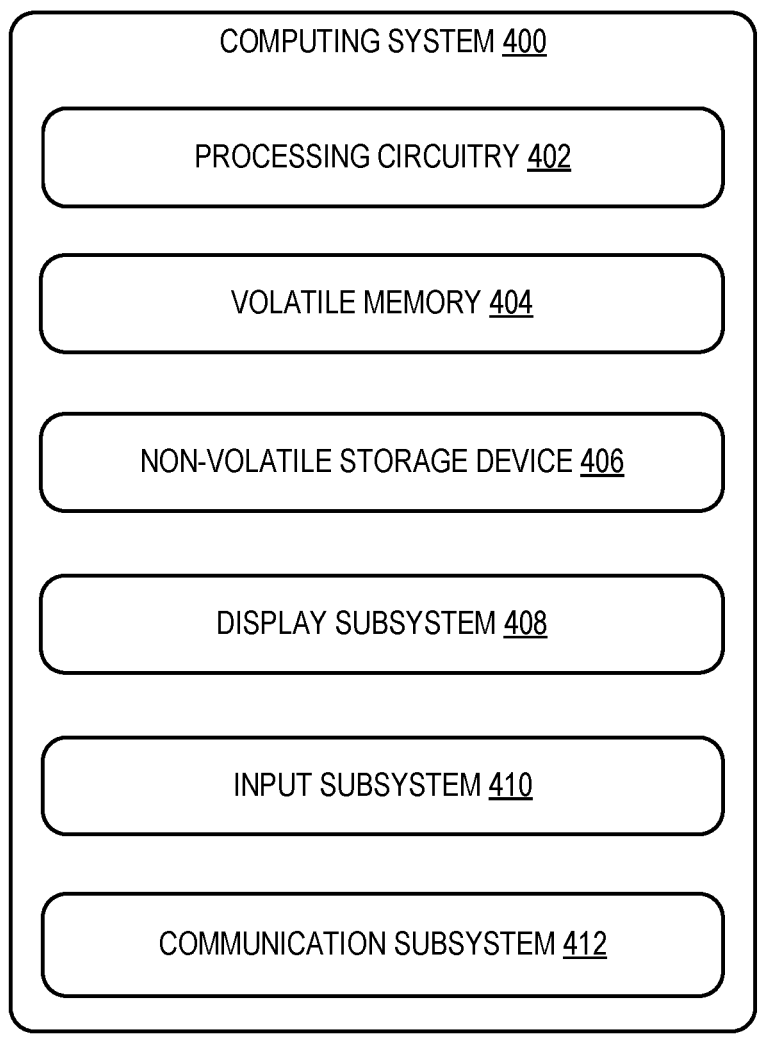
FIG. 5 shows an example computing environment of the present disclosure.

FIG. 5 schematically shows a non-limiting embodiment of a computing system 400 that can enact one or more of the methods and processes described above. Computing system 400 is shown in simplified form. Computing system 400 may embody the computing system 10 described above and illustrated in FIGS. 1 and 2. Components of computing system 400 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 400 includes processing circuitry 402, volatile memory 404, and a non-volatile storage device 406. Computing system 400 may optionally include a display subsystem 408, input subsystem 410, communication subsystem 412, and/or other components not shown in FIG. 5.

Processing circuitry 402 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 402 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 402.

Non-volatile storage device 406 includes one or more physical devices configured to hold instructions executable by the processing circuitry to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory, semiconductor memory, and/or magnetic memory, or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by processing circuitry 402 to temporarily store information during processing of software instructions. It will be appreciated that volatile memory 404 typically does not continue to store instructions when power is cut to the volatile memory 404.

Aspects of processing circuitry 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via processing circuitry 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "cprogram," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with processing circuitry 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, camera, or microphone.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 400 to send and/or receive messages to and/or from other devices via a network such as the Internet.

The following paragraphs provide additional support for the claims of the subject application. One aspect provides a computing system for managing data integrity during a write operation, comprising a host device comprising a memory controller configured to receive a plurality of original data blocks, each original data block having an associated initial Cyclic Redundancy Check (CRC) value; and segment and recombine the received original data blocks into logic blocks; and a storage device configured to write the logic blocks to non-volatile memory of the storage device in the write operation; calculate a new logic block (LB) CRC value for each logic block; and calculate a combined LB CRC value for the logic blocks by combining the LB CRC values, the memory controller further configured to combine duplicated copies of a given CRC value for each of the original data blocks to calculate an application CRC value for each original data block; combine the application CRC values together to calculate a combined data CRC value; compare the combined data CRC value to the combined LB CRC value to determine whether the combined data CRC value matches the combined LB CRC value; and responsive to determining that the combined data CRC value matches the combined LB CRC value, generate and output a verification response verifying the integrity of the write operation. In this aspect, additionally or alternatively, the memory controller may segment the original data blocks into different sizes before recombining them into the logic blocks, and incorporates the initial CRC values from the original data blocks into the logic blocks. In this aspect, additionally or alternatively, single block CRC calculations may be performed for only one step during the write operation. In this aspect, additionally or alternatively, the memory controller may implement Non-Volatile Memory Express (NVMe) protocol to perform the write operation. In this aspect, additionally or alternatively, the memory controller may receive a write confirmation from the storage device after writing the logic blocks to the non-volatile memory of the storage device. In this aspect, additionally or alternatively, the write confirmation may be a completion queue entry incorporating the combined LB CRC value. In this aspect, additionally or alternatively, the memory controller may combine CRC values of the logic blocks and the data blocks by concatenating the blocks virtually in their original order and calculating a CRC for the concatenated virtual block. In this aspect, additionally or alternatively, the memory controller may use the same CRC algorithm and polynomial for generating CRC values for the original data blocks, the logic blocks, and the combined CRC values.

Another aspect provides a computing system for managing data integrity during a read operation, comprising a memory controller configured to identify specific logic blocks that are to be retrieved from non-volatile memory of a storage device to read desired data segments in the specific logic blocks; and issue a read command to the storage device; and the storage device configured to execute the read command to read the specific logic blocks; calculate a logic block (LB) Cyclic Redundancy Check (CRC) value for each specific logic block, the memory controller further configured to determine a head segment immediately preceding the desired data segments; calculate a head CRC value for the head segment; determine a tail segment immediately following the desired data segments; calculate a tail CRC value for the tail segment; retrieve an existing CRC value corresponding to the desired data segments from one of the specific logic blocks; combine the head CRC value, the tail CRC value, and the existing CRC value together to calculate a final combined segments CRC value; combine the LB CRC values of the specific logic blocks to calculate a combined LB CRC value; compare the combined LB CRC value to the final combined segments CRC value to determine whether the combined LB CRC value matches the final combined segments CRC value; and responsive to determining that the combined LB CRC value matches the final combined segments CRC value, generate a verification response verifying the integrity of the read operation. In this aspect, additionally or alternatively, the memory controller may combine CRC values of the logic blocks by concatenating the blocks virtually in their original order and calculating a CRC for the concatenated virtual block. In this aspect, additionally or alternatively, the memory controller may use the same CRC algorithm and polynomial for generating CRC values for the logic blocks and the combined CRC values. In this aspect, additionally or alternatively, the memory controller may not recalculate an attached CRC value for each read logic block. In this aspect, additionally or alternatively, the memory controller may be further configured to estimate a latency burden of calculating a segment CRC value of the desired data segments; determine whether the estimated latency burden is below a predetermined threshold; and responsive to determining that the estimated latency burden is below the predetermined threshold, calculate the segment CRC value of the desired data segments, retrieve the existing CRC value corresponding to the desired data segments from one of the specific logic blocks, and generate the verification response based on a comparison of the existing CRC value and the segment CRC value.

Another aspect provides a computing method for managing data integrity during a write operation, comprising at a memory controller, receiving a plurality of original data blocks, each original data block having an associated initial Cyclic Redundancy Check (CRC) value; and segmenting and recombining the received original data blocks into logic blocks; and at a storage device, writing the logic blocks to non-volatile memory of the storage device in the write operation; calculating a new logic block (LB) CRC value for each logic block; and calculating a combined LB CRC value for the logic blocks by combining the LB CRC values, the computing method further comprising, at the memory controller, combining duplicated copies of a given CRC value for each of the original data blocks to calculate an application CRC value for each original data block; combining the application CRC values together to calculate a combined data CRC value; comparing the combined data CRC value to the combined LB CRC value to determine whether the combined data CRC value matches the combined LB CRC value; and responsive to determining that the combined data CRC value matches the combined LB CRC value, generating and outputting a verification response verifying the integrity of the write operation. In this aspect, additionally or alternatively, the data blocks may be segmented into different sizes before recombining them into the logic blocks, and the initial CRC values from the original data blocks are incorporated into the logic blocks. In this aspect, additionally or alternatively, single block CRC calculations may be performed for only one step during the write operation. In this aspect, additionally or alternatively, a Non-Volatile Memory Express (NVMe) protocol may be implemented to perform the write operation. In this aspect, additionally or alternatively, the method may further comprise receiving a write confirmation from the storage device after writing the logic blocks to the non-volatile memory of the storage device. In this aspect, additionally or alternatively, the write confirmation may be a completion queue entry incorporating the combined LB CRC value. In this aspect, additionally or alternatively, the same CRC algorithm and polynomial may be used for generating CRC values for the original data blocks, the logic blocks, and the combined CRC values.

It will be appreciated that "and/or" as used herein is defined as the inclusive or V, as specified by the following truth table:

| A | B | A V B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for managing data integrity during a write operation, comprising:
 a host device comprising a memory controller configured to:
  receive a plurality of original data blocks, each original data block having an associated initial Cyclic Redundancy Check (CRC) value; and
  segment and recombine the received original data blocks into logic blocks; and
 a storage device configured to:
  write the logic blocks to non-volatile memory of the storage device in the write operation;
  calculate a new logic block (LB) CRC value for each logic block; and
  calculate a combined LB CRC value for the logic blocks by combining the LB CRC values, wherein the memory controller is further configured to:
   combine duplicated copies of a given CRC value for each of the original data blocks to calculate an application CRC value for each original data block;
   combine the application CRC values together to calculate a combined data CRC value;
   compare the combined data CRC value to the combined LB CRC value to determine whether the combined data CRC value matches the combined LB CRC value; and
   responsive to determining that the combined data CRC value matches the combined LB CRC value, generate and output a verification response verifying the integrity of the write operation.

2. The computing system of claim 1, wherein the memory controller segments the original data blocks into different sizes before recombining them into the logic blocks, and incorporates the initial CRC values from the original data blocks into the logic blocks.

3. The computing system of claim 1, wherein single block CRC calculations are performed for only one step during the write operation.

4. The computing system of claim 1, wherein the memory controller implements Non-Volatile Memory Express (NVMe) protocol to perform the write operation.

5. The computing system of claim 1, wherein the memory controller receives a write confirmation from the storage device after writing the logic blocks to the non-volatile memory of the storage device.

6. The computing system of claim 5, wherein the write confirmation is a completion queue entry incorporating the combined LB CRC value.

7. The computing system of claim 1, wherein the memory controller combines CRC values of the logic blocks and the data blocks by concatenating the blocks virtually in their original order and calculating a CRC for the concatenated virtual block.

8. The computing system of claim 1, wherein the memory controller uses the same CRC algorithm and polynomial for generating CRC values for the original data blocks, the logic blocks, and the combined CRC values.

9. A computing system for managing data integrity during a read operation, comprising:
a memory controller configured to:
identify specific logic blocks that are to be retrieved from non-volatile memory of a storage device to read desired data segments in the specific logic blocks; and
issue a read command to the storage device; and
the storage device configured to:
execute the read command to read the specific logic blocks;
calculate a logic block (LB) Cyclic Redundancy Check (CRC) value for each specific logic block, wherein the memory controller is further configured to:
determine a head segment immediately preceding the desired data segments;
calculate a head CRC value for the head segment;
determine a tail segment immediately following the desired data segments;
calculate a tail CRC value for the tail segment;
retrieve an existing CRC value corresponding to the desired data segments from one of the specific logic blocks;
combine the head CRC value, the tail CRC value, and the existing CRC value together to calculate a final combined segments CRC value;
combine the LB CRC values of the specific logic blocks to calculate a combined LB CRC value;
compare the combined LB CRC value to the final combined segments CRC value to determine whether the combined LB CRC value matches the final combined segments CRC value; and
responsive to determining that the combined LB CRC value matches the final combined segments CRC value, generate a verification response verifying the integrity of the read operation.

10. The computing system of claim 9, wherein the memory controller combines CRC values of the logic blocks by concatenating the blocks virtually in their original order and calculating a CRC for the concatenated virtual block.

11. The computing system of claim 9, wherein the memory controller uses the same CRC algorithm and polynomial for generating CRC values for the logic blocks and the combined CRC values.

12. The computing system of claim 9, wherein the memory controller does not recalculate an attached CRC value for each read logic block.

13. The computing system of claim 9, wherein the memory controller is further configured to:
estimate a latency burden of calculating a segment CRC value of the desired data segments;
determine whether the estimated latency burden is below a predetermined threshold; and
responsive to determining that the estimated latency burden is below the predetermined threshold, calculate the segment CRC value of the desired data segments, retrieve the existing CRC value corresponding to the desired data segments from one of the specific logic blocks, and generate the verification response based on a comparison of the existing CRC value and the segment CRC value.

14. A computing method for managing data integrity during a write operation, comprising:
at a memory controller,
receiving a plurality of original data blocks, each original data block having an associated initial Cyclic Redundancy Check (CRC) value; and
segmenting and recombining the received original data blocks into logic blocks; and
at a storage device,
writing the logic blocks to non-volatile memory of the storage device in the write operation;
calculating a new logic block (LB) CRC value for each logic block; and
calculating a combined LB CRC value for the logic blocks by combining the LB CRC values, wherein the computing method further comprises, at the memory controller,
combining duplicated copies of a given CRC value for each of the original data blocks to calculate an application CRC value for each original data block;
combining the application CRC values together to calculate a combined data CRC value;
comparing the combined data CRC value to the combined LB CRC value to determine whether the combined data CRC value matches the combined LB CRC value; and
responsive to determining that the combined data CRC value matches the combined LB CRC value, generating and outputting a verification response verifying the integrity of the write operation.

15. The computing method of claim 14, wherein the data blocks are segmented into different sizes before recombining them into the logic blocks, and the initial CRC values from the original data blocks are incorporated into the logic blocks.

16. The computing method of claim 14, wherein single block CRC calculations are performed for only one step during the write operation.

17. The computing method of claim 14, wherein a Non-Volatile Memory Express (NVMe) protocol is implemented to perform the write operation.

18. The computing method of claim 14, further comprising receiving a write confirmation from the storage device after writing the logic blocks to the non-volatile memory of the storage device.

19. The computing method of claim 18, wherein the write confirmation is a completion queue entry incorporating the combined LB CRC value.

20. The computing method of claim 14, wherein the same CRC algorithm and polynomial are used for generating CRC values for the original data blocks, the logic blocks, and the combined CRC values.

* * * * *